10/20/87 OR 4,701,025

United States Patent [19]

Endo et al.

[11] Patent Number: 4,701,025

[45] Date of Patent: Oct. 20, 1987

[54] LIQUID CRYSTAL DISPLAY DEVICE WITH DRIVING METHOD TO ELIMINATE BLUR DUE TO FREQUENCY DEPENDENCE

[75] Inventors: Shyusuke Endo; Naofumi Aoyama; Toshihiko Yabuuchi, all of Mobara; Toshiyuki Sakuma, Isumi; Kiyoshige Kinugawa, Chosei, all of Japan

[73] Assignee: Hitachi, Ltd., Tokyo, Japan

[21] Appl. No.: 766,944

[22] Filed: Aug. 19, 1985

[30] Foreign Application Priority Data

Aug. 20, 1984 [JP] Japan ............................ 59-171627

[51] Int. Cl.[4] ............................ G02F 1/13

[52] U.S. Cl. ............................ 350/333

[58] Field of Search ............................ 350/333

[56] References Cited

U.S. PATENT DOCUMENTS 3,995,942 12/1976 Kawakami et al. ............ 350/333
4,404,555 7/1983 Long et al. ............ 350/333 X
4,485,380 11/1984 Soneda et al. ............ 350/333 X
4,638,310 1/1987 Ayliffe ............ 350/333 X
4,640,582 2/1987 Oguchi et al. ............ 350/333

FOREIGN PATENT DOCUMENTS 2103003A 2/1983 United Kingdom ............ 350/333

*Primary Examiner*—Stanely D. Miller
*Assistant Examiner*—Richard F. Gallivan
*Attorney, Agent, or Firm*—Antonelli, Terry & Wands

[57] ABSTRACT

Between a liquid crystal module and a control circuit for controlling said liquid crystal module, there are provided that a counter circuit for counting down a timing signal given by said control circuit and an exclusive-OR circuit whose inputs are square wave pulses delivered from said counter circuit and square wave pulses given by said control circuit with a period of twice the frame period. The polarity of voltages applied to liquid crystal module is reversed by square wave pulses delivered from the exclusive-OR circuit with frequency higher than the frame frequency.

4 Claims, 11 Drawing Figures

LIQUID CRYSTAL DISPLAY DEVICE WITH DRIVING METHOD TO ELIMINATE BLUR DUE TO FREQUENCY DEPENDENCE

BACKGROUND OF THE INVENTION

The present invention relates to a liquid crystal display device and more particularly to a driving circuit in the liquid crystal display device.

In the case of time multiplex driving of liquid crystal display elements, the average cross-talk voltage method is usually used as described in U.S. Pat. No. 3,976,362 to Kawakami and the polarity of voltages applied to liquid crystal layer is periodically reversed so that the liquid crystal layer has no mean DC level applied to it. For polarity reversal, there are two kinds of methods, one of which is to convert the driving waveforms into alternating waveforms by inverting the polarity within one frame period (the time necessasry to scan all scanning lines once), and is hereafter referred to as driving method A, and the other is to convert the driving waveforms by inverting the polarity within the period of two frames and is hereafter referred to as driving method B. These methods of time multiplex driving for liquid crystal display elements are discussed in detail, for example, in the Nikkei Electronics, Aug. 18th, 1980, pp 150–174.

The time multiplex driving for liquid crystal display elements is described in the above mentioned patent and reference, at present the driving method B is used mainly with the increase of scanning line numbers for time multiplexing in order to decrease the load of a driver LSI.

However, since the lowest driving frequency in the driving method B is the half of the frame frequency, e.g. 70 Hz, there may be the case that liquid crystal display elements are driven in very low frequency according to a pattern to be displayed. On the other hand, the threshold voltage of the liquid crystal has a characteristic dependent on frequency of applied voltages and in the case that the threshold voltage of the liquid crystal, a voltage at which ON-state of liquid crystal display elements begins to be visible, falls largely in lower frequencies, strong blurs occur in display according to particular display patterns when the driving method B is used. For example, if the liquid crystal has a characteristic in which the threshold voltage $V_{th}$ drops in lower frequencies as is shown in FIG. 1, and the alphabet E is displayed by applying voltage between signal electrodes $C_1, C_2 \ldots C_{20}$ and scanning electrodes $R_1, R_2 \ldots R_{27}$ selectively as in FIG. 2, the contrast of the shaded areas of $A_1, A_2$ and $A_3$ is lower than that of the selected element D on $B_1$ and $B_2$ areas but higher than the non-selected areas E on $B_1$ and $B_2$. As a result, dark shades appear near an intended display as shadows. This phenomenon can be explained as follows. The frequency components of the driving voltage $V_0$ applied to the liquid crystal display elements on the areas of $A_1, A_2$ and $A_3$ are extremely lower than those of the driving voltage $V_0$ applied to the liquid crystal display elements on the areas of $B_1$ and $B_2$. Considering the frequency dependence of the threshold voltage shown in FIG. 1, the voltage $V_1$ applied to the elements on $A_1, A_2$ and $A_3$ areas with respect to their threshold voltages at their frequency are higher than the voltage $V_2$ applied to the elements on $B_1$ and $B_2$ areas with respect to their threshold voltages at their frequency and as a result, contrast of the elements on $A_1, A_2$ and $A_3$ areas is higher than that of the non-selected elements on $B_1$ and $B_2$ areas and the phenomenon of blurs occurs around the display. As an example, the driving waveforms are shown in FIGS. 3 (*a*) to (*j*) which are applied to the display elements $a_1, a_2, a_3$ and $a_4$ shown in FIG. 2 by the driving method B. In these figure, by comparing the driving waveforms applied to the display elements $A_2$ with the driving waveforms applied to the remaining display elements $a_1, a_3$ and $a_4$, it can be understood that the frequency components of the driving waveforms applied to the display element $a_2$ is extremely higher than the frequency components of the driving waveforms applied to the display elements $a_1, a_3$ and $a_4$, and, from the relations shown in FIG. 1, it can be understood easily that the blurs in display become excessively conspicuous with the increase of frequency range of the driving waveforms. Further, in FIG. 2 the $B_1$ area appears blanched compared with $B_2$ areas due to the higher frequency components for the $B_1$ area, and this phenomenon can be explained in the same way as above. Further, in FIG. 3 a symbol $\tau_d$ designates a pulse width of a scanning signal.

As a solution for this problem, it may be considered to use the driving method A, but it is known that different type of blurs in display appear by this driving method A.

SUMMARY OF THE INVENTION

An object of the present invention is to provide a liquid crystal display device free from the blurs in display due to the lowering of the threshold voltage of the liquid crystal in low frequency.

The above mentioned object can be accomplished by the present invention which provides a liquid crystal display device comprising:

a liquid crystal module including a liquid crystal display panel having a plurality of liquid crystal picture elements arranged in a matrix form, and driving circuits for applying driving signals to signal electrodes and to scanning electrodes of the liquid crystal display panel, respectively;

a control circuit for controlling the operation of the liquid crystal module;

first means for dividing frequency of timing signal given by the control circuit and producing a first signal of lower frequency; and second means for inverting the first signal of lower frequency once per frame period and generating a second signal to reverse the polarity of voltages applied to liquid crystal display elements with frequency higher than frame frequency.

DETAILED DESCRIPTION OF PREFERRED EMBODIMENTS

Before explaining the embodiments, the liquid crystal display device to which this invention is applied will be explained.

Figure 4:
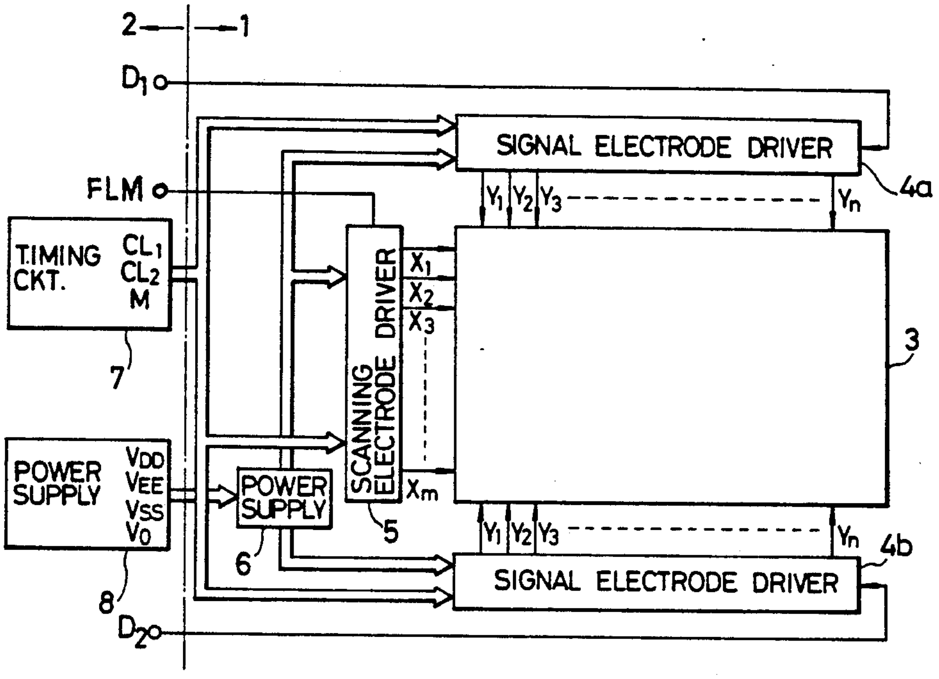
FIG. 4 is a block diagram of one example of a liquid crystal display device to which the present invention is applied.

FIG. 4 is a block diagram showing one example of the liquid crystal display device comprising a liquid crystal module and a control circuit for controlling this liquid crystal module.

In this figure reference numeral 1 denotes a liquid crystal module comprising a liquid crystal display panel having a plurality of liquid crystal picture elements arranged in a matrix form and driving circuits for the liquid crystal and 2 denotes a control circuit for controlling the performance of the liquid crystal module 1. Numeral 3 denotes the liquid crystal display panel shown in FIG. 2, 4*a* and 4*b* signal electrode driving circuits for giving signal voltages as its outputs to the Y axis signal lines $Y_1, Y_2, Y_3 \ldots Y_n$ of the liquid crystal display panel 3, 5 a scanning electrode driving circuit for giving selective pulses as its outputs for scanning the X axis scanning lines $X_1, X_2, X_3 \ldots X_m$ of the liquid crystal display panel 3, sequentially, and 6 a power supply for supplying proper voltages to drive the signal electrode driving circuits 4*a*, 4*b* and the scanning electrode driving circuit 5 by the averaged cross talk voltage method as described in U.S. Pat. No. 3,976,362 to Kawakami. Numeral 7 denotes a timing circuit for generating the latch signal $CL_1$, data shift signal $CL_2$ and control signal M for AC driving as the timing signals to operate the liquid crystal module 1, and 8 a power supply for supplying the proper voltage to the power supply 6. Symbols $D_1$ and $D_2$ denote data terminals to which ON-OFF informations for all picture elements on the signal electrodes $Y_1, Y_2, Y_3 \ldots Y_n$ are given serially as the inputs and FLM an input terminal to which the frame frequency signal is given as its input. Further explanation is described in "Liquid-Crystal Matrix Displays", Advances in Image Pickup and Display, Academic Press.

Figure 5:
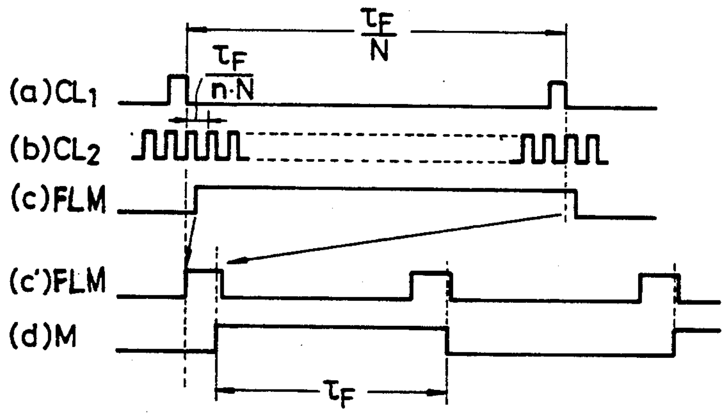
FIGS. 5 (*a*) to (*d*) show timing charts of the operations in FIG. 4.

Also FIGS. 5 (*a*) to (*d*) show timing charts of the output signals of the control circuit 2 shown in FIG. 4 by the driving method B.

In this configuration, ON-OFF information signals for all picture elements on a certain scanning line are given to the data terminals $D_1$ and $D_2$ serially as inputs. The shift register in the signal electrode driving circuits 4*a* and 4*b* shift the data according to the data shift signal $CL_2$. And latch signal $CL_1$ is outputted when the shift register is filled by the serial data and is latched by a latch circuit. By switching an analog multiplexer according to the latched data and taking out the pulse signals for either selecting or non-selecting elements, desired picture elements can be displayed. In this case, the latch signal $CL_1$ generates signals at every time interval which equals to the divided value of the frame period $\tau_F$ by N, which is the numbers of time multiplexed scanning lines and ratches the data. Also, in the driving method B, as has been mentioned above, the driving waveforms for the liquid crystal are converted into alternating waveforms by inverting the polarity within two frames and the complete alternating waveforms within two frames can be obtained by the control signal M having the period of twice the frame period $\tau_F$. By using such a driving method, when all elements are displayed (ON) or all elements are not displayed (OFF), the frequencies of the driving waveforms applied to the liquid crystal equal to about the half of the frame frequency $f_F = 1/\tau_F$. Like this, in the driving method B the lowest frequency component is low and this causes the blurs in display.

Figure 6:
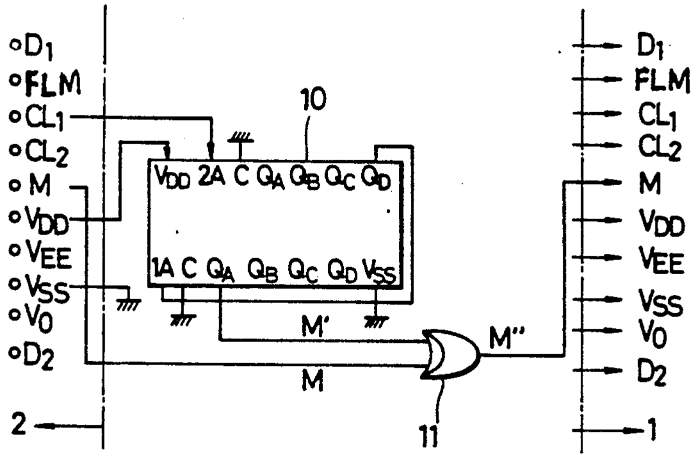
FIG. 6 is a circuit diagram showing an embodiment of the present invention.
Figure 7:
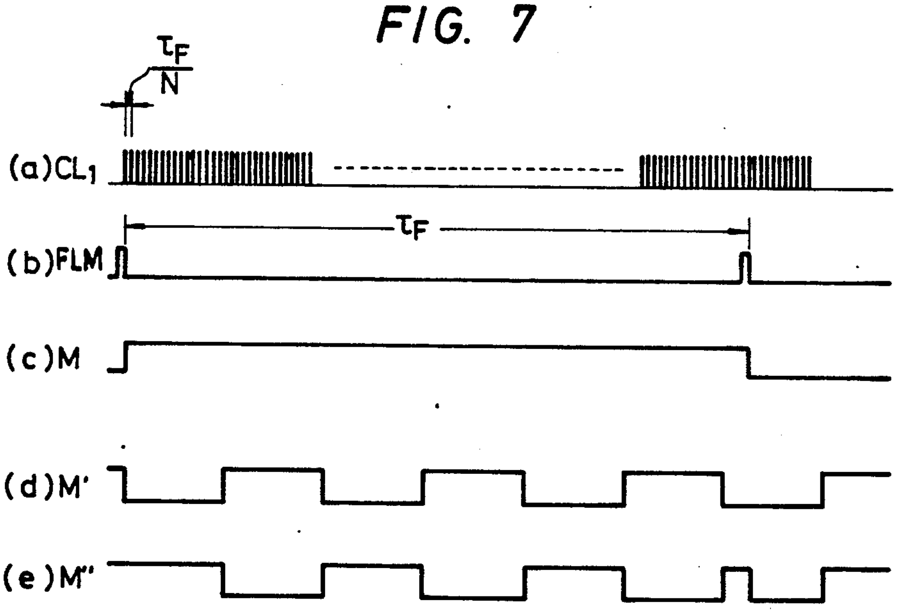
FIGS. 7 (*a*) to (*e*) show the timing charts of the operation in FIG. 6.
Figure 8:
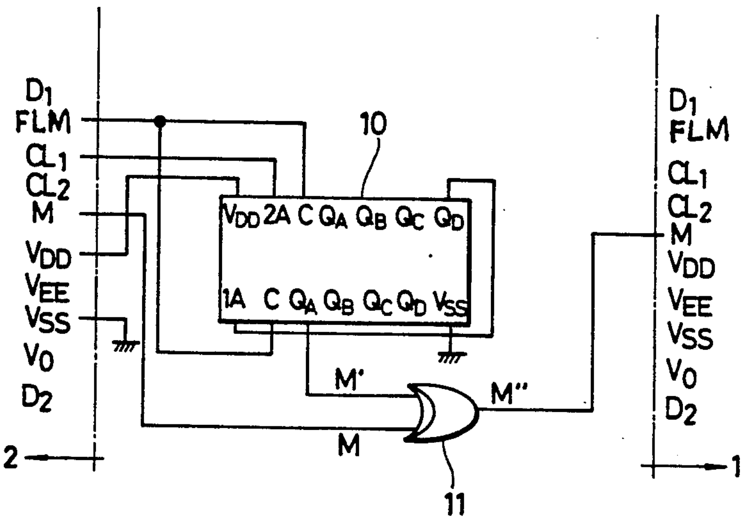
FIG. 8 is a circuit diagram showing another embodiment of the present invention.
Figure 9:
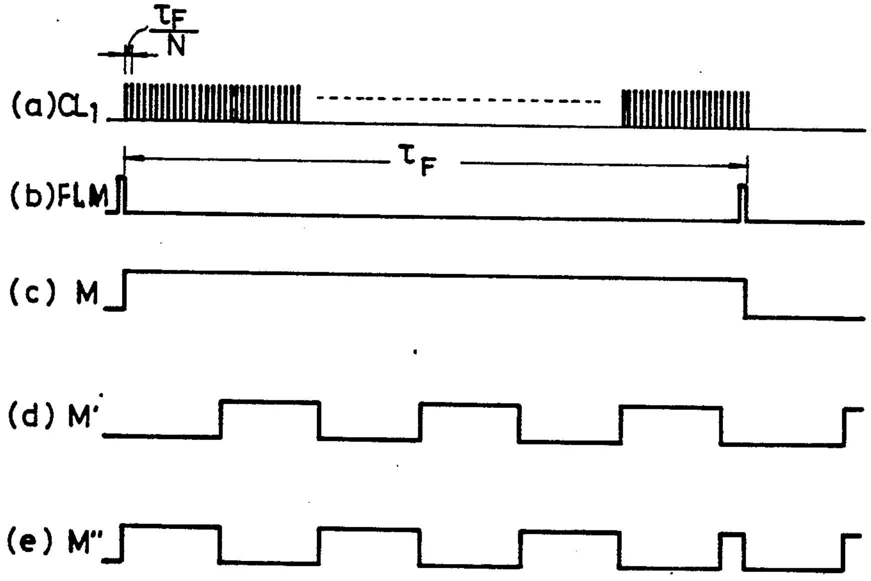
FIGS. 9 (*a*) to (*e*) show timing charts of the operations of the circuit shown in FIG. 8.

The first and second embodiments of the present invention are shown in FIGS. 6 and 8, respectively. According to the present invention, there are provided a counter 10 which counts the latch signals $CL_1$ and generates the new control signal M' for Ac driving as the output, and an exclusive-OR circuit 11 which generates as its output further new control signal M" which corresponds to the control signal M' inverted once per frame period for reversing the polarity of voltages applied to liquid crystal display elements with frequency higher than frame frequency, that is for AC driving, from the above control signal M' and the control signal M originally used for the driving method B, generated by the control circuit 2, between the liquid crystal module 1 and the control circuit 2 as is shown in FIG. 6 and in FIG. 8. Where the new control signal M' to be generated by dividing the frequency of the signal $CL_1$ is obtained by counting the signal $CL_1$ 16 times in these embodiments and the signal M" is obtained as the output of the exclusive-OR circuit which carries out the operation of exclusive-OR between the output M' of the counter 10 and the original M given by the controlling circuit 2. FIGS. 7 (*a*) to (*e*) show the timing for each signal $CL_1$,FLM,M,M', and M" in the first embodiment and FIGS. 9 (*a*) to (*e*) show the timing for each signal in the second embodiment.

In the second embodiment shown in FIG. 8, the frame frequency signal is applied to resetting terminals of the counter 10 and the driving is carried out in synchronism with the frame frequency signal. In the first embodiment shown in FIG. 6, the resetting terminals of the counter 10 are grounded and the driving is asynchronous with the frame frequency signal. By these circuit constructions, the complete alternating waveforms can be obtained within two frames in the second embodiment and within eight frames in the first embodiment, respectively.

By the above configurations, the lowest driving frequency can be set to higher frequency than the lowest driving frequency in the conventional driving B method and the blurs in display due to the lowering of the threshold voltage $V_{th}$ of the liquid crystal in the lower frequencies can be reduced.

Figure 1:
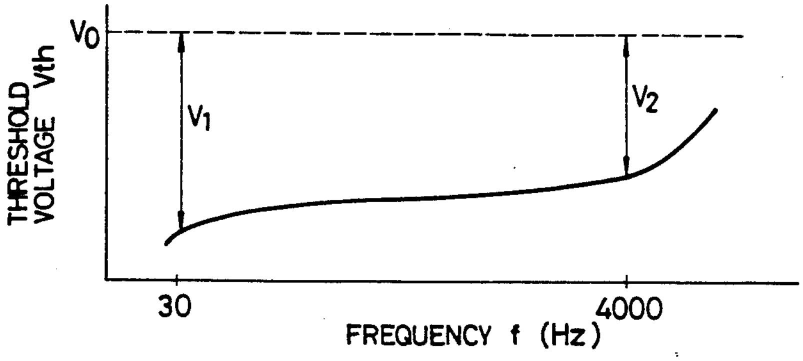
FIG. 1 shows the frequency dependence of the threshold voltage.
Figure 3:
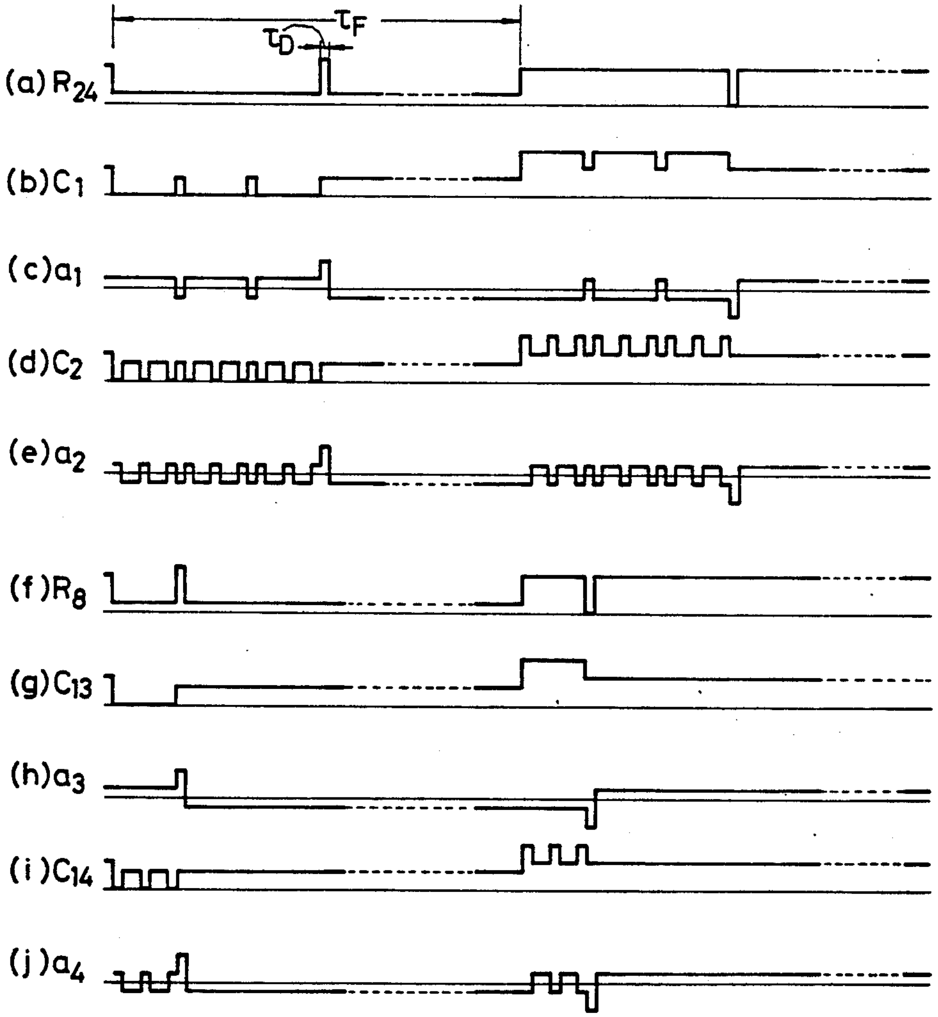
FIGS. 3 (*a*) to (*j*) show timing charts of the operations in FIG. 2.
Figure 2:
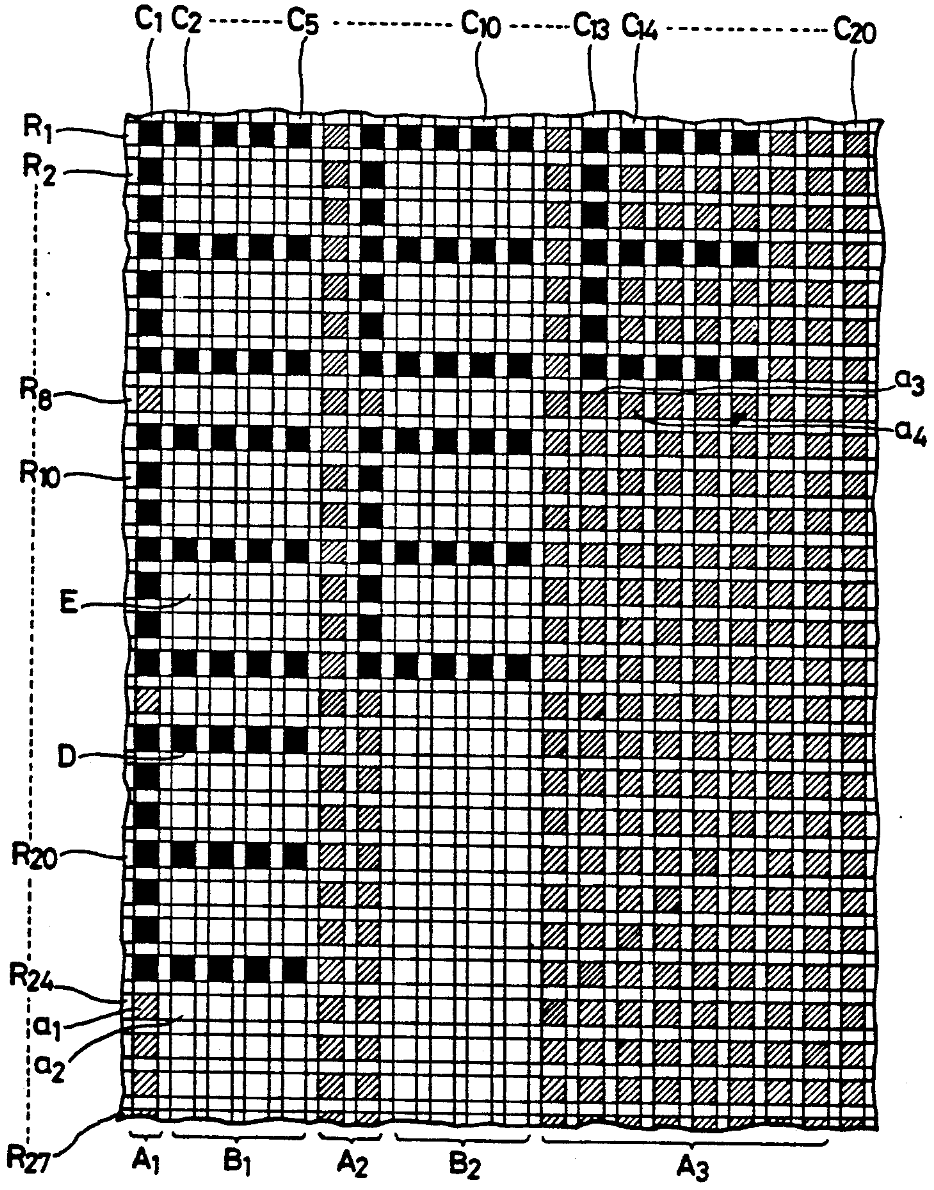
FIG. 2 is a diagram for illustrating the occurrence of blurs in display in the case of displaying the pattern of the alphabet E on the liquid crystal panel.
Figure 10:
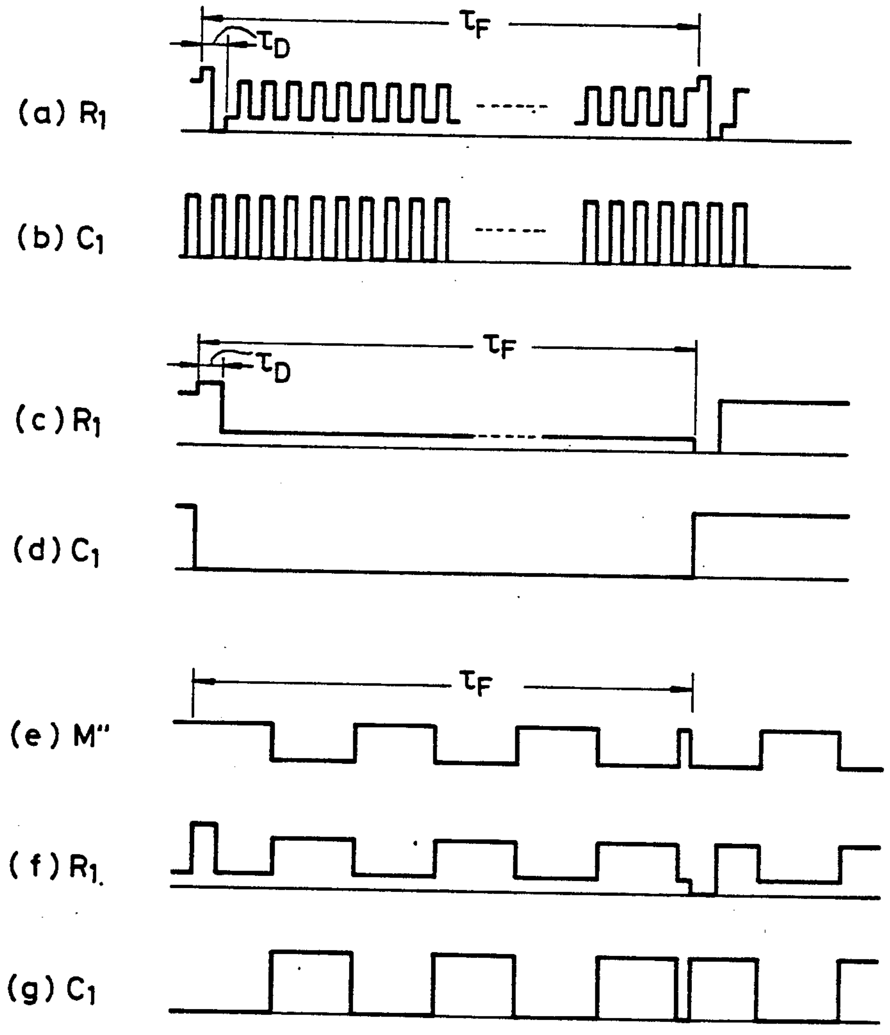
FIGS. 10 (*a*) to (*g*) are voltage waveforms for illustrating the difference of the driving frequencies by each driving method, that is the driving method A, the driving method B and the driving in the first embodiment of the present invention in the case of displaying all elements of the liquid crystal panel.
Figure 11:
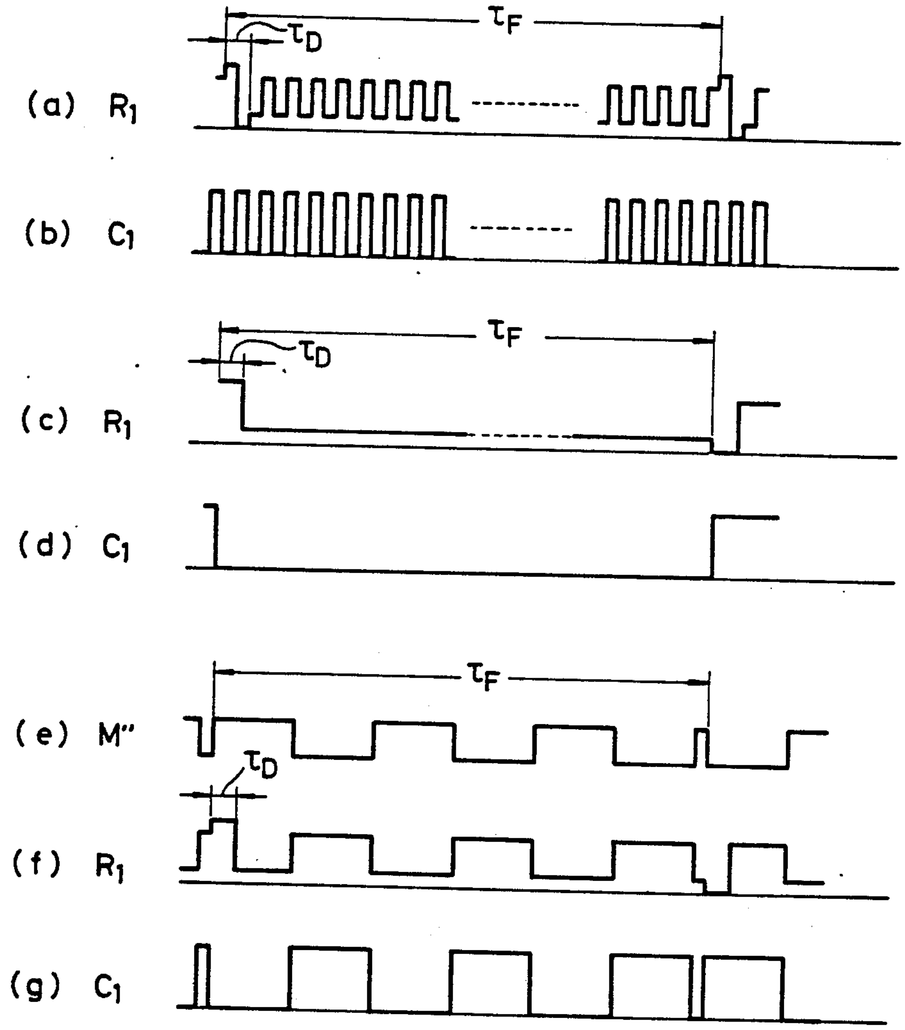
FIGS. 11 (*a*) to (*g*) show voltage waveforms for illustrating the difference of the driving frequencies by each driving method, that is the driving method A the driving method B and the driving in the second embodiment of the present invention in the case of displaying all elements of the liquid crystal display panel.

FIGS. 10 (*a*) to (*g*) show the driving waveforms of the scanning electrode driving voltage $R_1$ and signal electrode driving voltage $C_1$ in the case of displaying all elements of the liquid crystal panel shown in FIG. 2 with making comparison among the driving method A, the driving method B and the driving by the first embodiment of the present invention. FIGS. 10. (*a*) and (*b*) show the driving waveforms by the driving method A, FIGS. 10 (*c*) and (d) show the waveforms by the driving method B, and FIGS. 10 (*e*), (*f*) and (*g*) show the waveforms in the first embodiment. As is evident from these figures since the driving frequency in the present invention can be set to be lower than that by the driving method A and to be higher than that by the driving method B, it is possible to eliminate the blurs in display. Also, FIGS. 11 (*a*) to (*g*) show the driving waveforms of the scanning electrode voltage $R_1$ and the signal electrode driving voltage $C_1$ in the case of displaying all elements of the liquid crystal display panel shown in FIG. 2 with making a comparison among the driving method A, the driving method B and the driving by the second embodiment. FIGS. 11 (*a*) and (*b*) show the driving waveforms by the driving method A, FIGS. 11 (*c*) and (*d*) show the driving waveforms by the driving method B and FIGS. 11 (*e*), (*f*) and (*g*) show the driving waveforms in the second embodiment. As is evident from these figures since the driving voltage frequency in the present invention can be set to be lower than that by the driving method A and to be higher than that by the driving method B, it is possible to eliminate the blurs in display by this embodiment.

Also, since the driving circuits in the present invention is simple circuits with only two CMOS type integrated circuits added to the conventional driving circuits, theremay be no large rise in the cost. And when this driving circuit is considered as a black box from the stand point of usage this circuit is equvalent ot the conventional circuits and it has a good compatibility as a system.

In the above mentioned embodiments, the frequency divider of the latch signal $CL_1$ is a binary counter, but it is not limited to a binary counter.

What is claimed is:

1. A liquid crystal display device comprising:
   - a liquid crystal module including a liquid crystal display panel having a plurality of liquid crystal picture elements arranged in a matrix form, and driving circuits for applying driving signals to signal electrodes and to scanning electrodes of the liquid crystal display panel, respectively;
   - a control circuit for controlling the operation of the liquid crystal module;
   - first means for dividing frequency of a timing signal given by the control circuit and producing a first signal of lower frequency; and
   - second means for inverting the first signal of lower frequency once per frame period and generating a second signal to reverse the polarity of voltages applied to liquid crystal display elements with frequency higher than the frame frequency.

2. A liquid crystal display device according to claim 1, wherein the first means is a counter circuit.

3. A liquid crystal display device according to claim 1, wherein the timing signal is a latch signal for latching information data for display.

4. A liquid crystal display device according to claim 1, wherein the second means is an exclusive-OR circuit which is supplied, as its input, with square wave pulses obtained from the first means and with square wave pulses with a period of twice the frame period.

* * * * *